May 17, 1966 M. W. FORTH 3,251,316
DIE STRUCTURE FOR WAFERING OR PELLETING MACHINES WITH
INTERCHANGEABLE DIE CELL MEANS
Original Filed July 10, 1961 2 Sheets-Sheet 1

*INVENTOR.*
M. W. FORTH

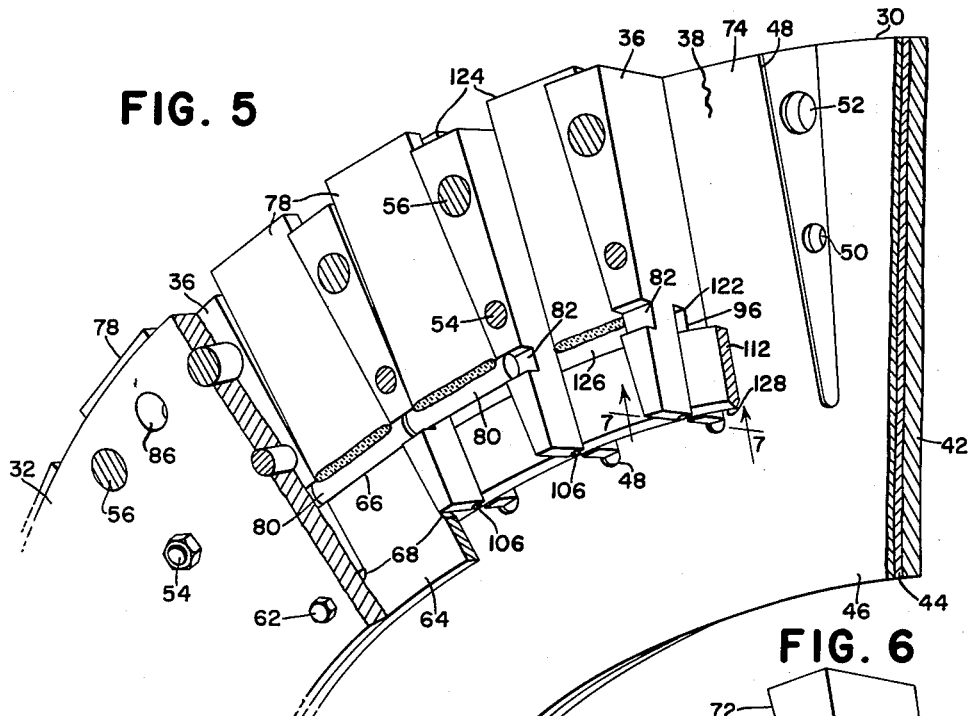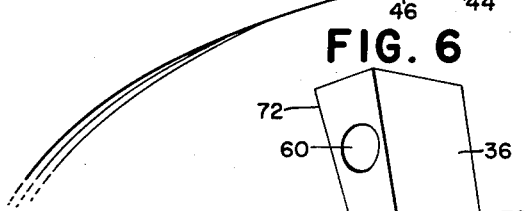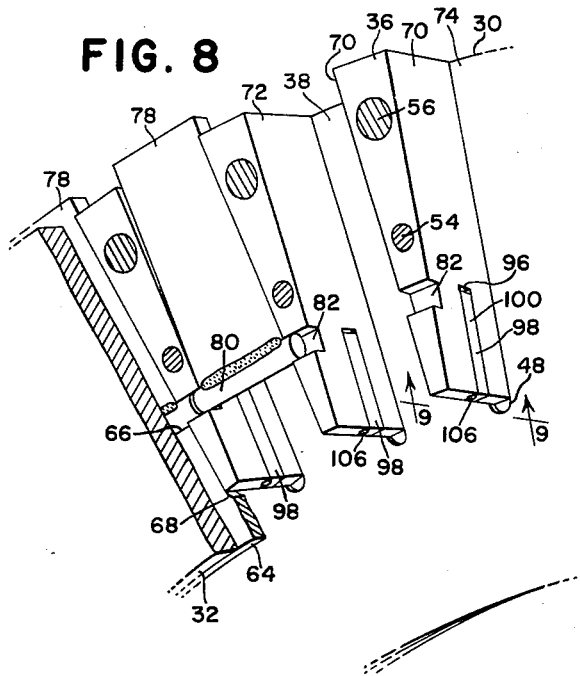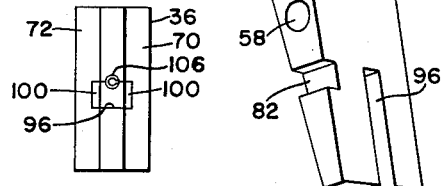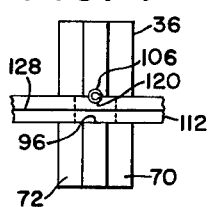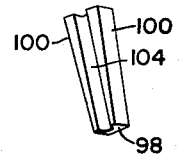
INVENTOR.
M. W. FORTH

United States Patent Office 3,251,316
Patented May 17, 1966

3,251,316
DIE STRUCTURE FOR WAFERING OR PELLETING MACHINES WITH INTERCHANGEABLE DIE CELL MEANS
Murray W. Forth, Moline, Ill., assignor to Deere & Company, Moline, Ill., a corporation of Delaware
Continuation of application Ser. No. 122,747, July 10, 1961. This application July 20, 1964, Ser. No. 385,547
The portion of the term of the patent subsequent to Aug. 3, 1982, has been disclaimed
20 Claims. (Cl. 107—14)

This is a continuation of application Serial No. 122,747, filed July 10, 1961, and now abandoned, as a continuation-in-part of application Serial No. 102,822, filed April 13, 1961, and now abandoned.

This invention relates to die structure for pelleting or wafering machines and has for its principal object the provision of improved die structure featuring a novel arrangement of die blocks and adjustable walls for the die openings.

In a machine of the character described, it is common to provide a die structure having therein a plurality of die openings through which material is extruded in pellet or wafer form, the object being to compress or condense the material into relatively small cakes, pellets or wafers which are more easily handled for transport, storage and ultimate disposition. Materials of this type and machines and processes for producing same are finding increasing favor in the agricultural field in the pelleting or wafering of hay and other forage, wherein the problems encountered are somewhat different from those met by designers in the field in which granular, pulverulent and relatively dry materials are handled.

In the design and production of a machine in which the die means comprises one or more annular members, one of the problems is to fabricate an annular die structure in which the components are structurally strong enough to withstand the relatively high pressures encountered, while at the same time eliminating unnecessary expense. Another problem resides in the desirability of providing means for varying the sizes of the die openings by the provision of adjustable or movable walls therein. The basic accomplishment of a die structure with a high strength-to-weight ratio and an adjustable wall element for each die opening forms the subject matter of copending application Ser. No. 377,457, filed June 18, 1964, as a continuation of Ser. No. 102,822, filed April 13, 1961, now abandoned.

The principal object of the present invention is to provide an improvement on the die structure shown in the above-identified application and primarily to afford means whereby the die structure may be made interchangeable by the addition thereto or the subtraction therefrom of at least one row of comparable die cells. In brief, the application just referred to discloses a structure having a single circumferential row of die openings. According to the present invention, the single row may be replaced by die structure affording a double row, all without material alterations in the basic structure, and at the same time the adjustability of die openings as to cross sectional area is retained. It is a further object to provide die blocks or spacers of such configuration and construction as to be adaptable to interchangeable parts so that the die structure may be used as a single-row die or as a multi-row die, it being understood that on the basis of the present disclosure multiplication beyond doubling the rows of die openings is possible.

The foregoing and other objects and desirable features inherent in and encompassed by the invention will become apparent as a preferred embodiment thereof is disclosed in detail in the ensuing description and accompanying sheets of drawings, the figures of which are described below.

FIG. 5 is a fragmentary perspective view, on an enlarged scale and partly in section, showing that area of the die structure designated generally by the arrow bearing the encircled numeral 5 in FIG. 1.

FIG. 6 is a slightly enlarged perspective of one of the die blocks or spacers.

FIG. 7 is a bottom or underside view as seen generally along the line 7—7 of FIG. 5, drawn to an enlarged scale.

FIG. 8 is a fragmentary perspective, similar to FIG. 5, but showing the die structure arranged with a single row of die openings.

FIG. 9 is an enlarged bottom view as seen generally along the line 9—9 of FIG. 8.

FIG. 10 is a perspective of one of the filler means used with the die blocks or spacers in the single-row arrangement.

Figure 1:
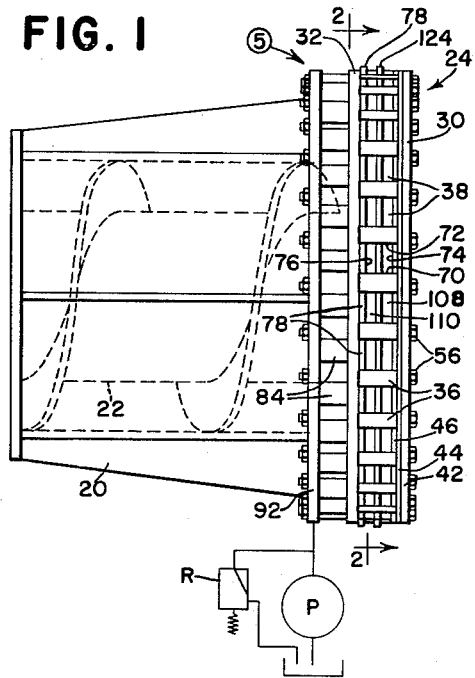
FIG. 1 is a side elevational view of a representative machine in which the improved die structure is embodied.
Figure 2:
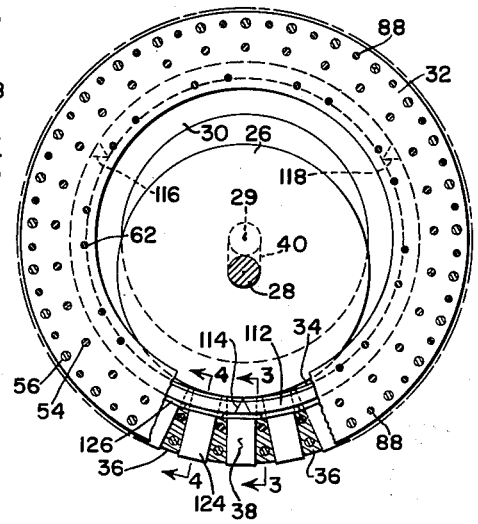
FIG. 2 is a view, partly in section, as seen along the line 2—2 of FIG. 1.

The representative machine shown in FIG. 1 comprises a basic feed casing or housing 20 having a cylindrically hollow interior within which a feed means such as an auger 22 rotates to convey material to the right as seen in the drawing, and this material is compacted and extruded in wafer or pellet form by means of an annular die structure or annulus, indicated in its entirety by the numeral 24, in cooperation with a die wheel or roller 26 which turns on a shaft 28 eccentric to the rotating axis of the auger 22, which axis is designated at 29 in FIG. 2.

Figure 3:
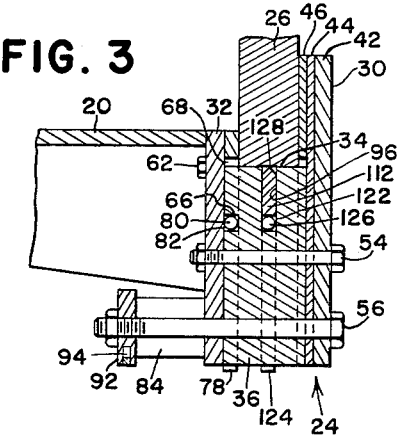
FIG. 3 is an enlarged fragmentary section as seen along the line 3—3 of FIG. 2.
Figure 4:
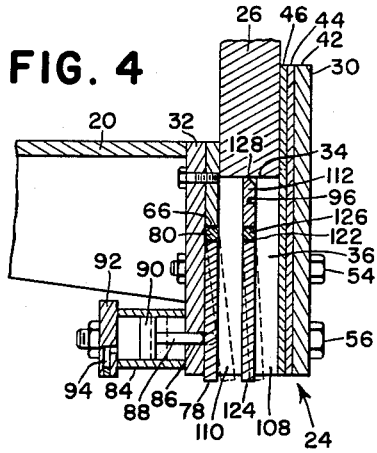
FIG. 4 is a similar enlarged fragmentary section as seen along the line 4—4 of FIG. 2.

The die annulus 24 is made up essentially of first and second parallel side plate means or elements 30 and 32, closely coaxially spaced apart in coaxiality with the cylindrical casing 20. As best shown in FIGS. 3 and 4, the circular plate 32 is in the form of a ring having its inside diameter substantially coincident with that of the auger housing 20. Its outside diameter is somewhat greater than that of the auger housing, which is true also of the outside diameter of the other plate 30. However, the plate 30 has an inside diameter considerably smaller than that of the plate 32 so as to afford a backing surface at one side of a track on which the periphery of the wheel or roller 26 runs, the periphery of this track lying on a concentric circle 34 at which terminate the inner radial ends of a plurality of spacers or die blocks 36, the outer ends of which lie on a circle substantially coincident with that on which lie the outside diameters of the side plate means 30 and 32. In the present case, the die blocks or spacer elements 36 are identical and are uniformly circumferentially spaced about the annulus and are rigidly interposed between the side plates 30 and 32 so as to afford a like plurality of radially extending openings 38, in this case having inlet ends on the circle 34 and outlet ends on the common circle representing the outside diameters of the plates 30 and 32 and the outer ends of the die blocks 36. Because of the annular nature of the structure, the die blocks are essentially of wedge shape, having their smaller ends radially inwardly and their larger ends radially outwardly. This is of course peculiar to a so-called internal die structure in which a roller or wheel, such as that shown at 26 here, runs on the internal track 34 in an annular die structure, such as that shown at 24 here. However, it is also known to run external die wheels in such manner that the material is extruded radially inwardly as contrasted from radially outwardly in the present case. It is also known to utilize a machine in which the wheel or roller, such as that shown at 26 here, is rotatable about a fixed axis while the die, as at 24 here, is rotatable, as contrasted to the reverse situation as presently disclosed. In the present case, the eccentricity of the wheel shaft 28 relative to the auger axis 29 is established by a crank, as at 40, so that as the wheel 26 rolls around the inner track or circle 34 of the die structure 24, the axis of the shaft 28 describes a circle about the axis 29. However, these differences are of minor significance and reversal of parts may be readily accomplished without sacrificing any of the principles of the present invention.

The plate means 30 is preferably of laminated nature, comprising a relatively heavy outer plate 42 and a pair of relatively thinner inner plates 44 and 46, the latter lying innermost and being provided with wedge-shaped notches at 48 which conform respectively to the wedge shapes of the blocks or spacers 36 and which receive the spacers to afford key means for preventing circumferential displacement of the spacers relative to the remainder of the die structure. The three plates 42, 44 and 46, which make up the plate means 30, may be secured together in any suitable manner, as by spot welding. Inner and outer circles of bolt holes 50 and 52 are provided in the plate means 30 for receiving inner and outer circles of bolts 54 and 56. Each die block or spacer 36 is provided with inner and outer bolt holes 58 and 60, through which the respective bolts 54 and 56 pass, and the plate means 32 is correspondingly apertured to receive these bolts, the bolts 56 being longer than the bolts 54, for purposes to presently appear.

The plate 32 has rigidly secured thereto, as by cap screws 62, an inner ring 64 which may have an inside diameter coincident with that of the plate means 32, but which has an outside diameter materially smaller than the outside diameter of the plate 32, lying generally on what may be regarded as a terminal outer circle 66; although, as will presently appear, the portions that lie on the "circle" 66 may actually be chords of that or a slightly larger circle. The reason for this is that the ring 64 is peripherally interrupted by a plurality of circumferentially spaced radially outwardly opening wedge-shaped notches 68 which respectively receive the inner or narrow ends of the spacers or blocks 36 at the sides thereof opposite to the recesses or notches 48 in the side plate means 30.

From the description thus far, it will be clear that each opening 38 is substantially rectangular in cross section, having four walls, two of which are made up by the circumferentially opposed faces of a neighboring pair of blocks 36, as at 70 and 72 (FIG. 8), and the third and fourth of which are made up, as at 74 and 76, by the axially opposed inner surfaces of those portions of the plate means 30 and 32 that extend between the opposed spacer faces 70 and 72 (FIG. 1). The structure thus far described is rigidly secured together to afford the composite die structure having the plurality of openings, all being similar and all being of generally rectangular cross section, and each having the four walls generally referred to as 70, 72, 74 and 76. However, the fourth wall 76 is adjustable relative to the other three for the purpose of varying the cross-sectional area of its opening at the outlet end thereof, which in this case is the radially outer end. For this purpose, the walls means 32 is provided, in addition to the ring 64, with a plurality of adjustable wall elements 78, having radially inner terminal ends proximate to the portions of the ring 64 that lie on the "circle" 66. In the present case, each wall element or tongue 78 is of a thickness comparable to that of the ring 64 so that in effect the tongues form movable radial extensions of the ring 64, the tongues of course intervening between the spacers 36 in opposition to the wall portions 74 of the wall means 30. Each tongue 78 is carried on hinge means including a pintle 80 welded to its inner radial end and projecting circumferentially so as to be receivable in circumferentially alined notches or recesses 82 in the blocks 36. These details are adequately set forth in the copending application referred to above, one of the characteristics of which is that the die blocks corresponding to those shown at 36 are solid at their radially inner ends so that the four walls, corresponding to those at 70, 72, 74 and 76 here, are relatively smooth and material extruded radially outwardly therethrough emerges as pellets or wafers.

It is also a characteristic of that invention that means is provided for automatically adjusting the tongues or wall elements 78 in accordance with the density of the material being extruded. As shown there, and as repeated here, the density control comprises a plurality of hydraulic cylinders 84, one for each tongue 78. These are arranged in annular relation and circumferentially spaced so as to be axially alined respectively with the tongues 78, the plate means 32 having a circle of holes 86 therein for respectively receiving piston rods 88 of pistons 90 carried in the cylinder (FIG. 4). The outer ends of the cylinders are associated with a manifold ring 92 which has passage means 94 therein communicating with a pressure source such as a pump P as shown schematically in FIG. 1. The reason for the increased length of the bolts 56 will now become apparent, since, as best shown in FIG. 3, the bolts extend beyond the plate means 32 and through the manifold ring 92 between the cylinders 84 so as to secure the assembly together. A relief valve R is associated with the hydraulic circuit and the pump maintains a predetermined pressure which, if exceeded, is maintained by dumping of the relief valve to reservoir, as will be obvious. That is to say, the pump pressure will keep the tongues 78 pressed inwardly toward the wall portions 74 in proportion to the density of material passing therethrough. If a particularly dense slug of material, or a foreign object, enters the die opening, the pressure will rise above the value set by the relief valve R and the entire system will be brought back to the predetermined pressure. As pointed out in the above-identified application, Serial No. 122,747, with further reference to another copending application (Ser. No. 66,874, filed Nov. 2, 1960), the system maintains a uniform density of the wafers or pellets being extruded.

It is also a characteristic of the structure in the first-identified copending application, and repeated here, that the spacers or blocks are adequately keyed to the plate means 30 and 32, as by the notches or recesses 48 and 68, as to substantially eliminate circumferential displacement. The bolts 54 and 56 are of sufficient strength to resist relative radial displacement.

The structure of the first-identified application can be duplicated here and at the same time it is modified to permit interchangeability so that the number of die openings, as at 38, may be doubled by providing two rows thereof instead of one row. Part of this feature resides in the provision in the radially inner end of each block 36 of a radially inwardly and oppositely circumferentially opening slot 96 which, when the single-row arrangement is used, is filled by filler means comprising a wedge-shaped element 98 shaped and dimensioned to substantially identically fit the slot in the associated block, this element having opposed faces 100 which lie respectively flush with the opposed faces 70 and 72 of the associated block 36. The inner marginal edge at one side of each slot 96 is provided with a semicylindrical groove 102, and a corresponding and complementary semicylindrical groove 104 is provided in each filler element. When the element is assembled in its block, the two grooves cooperate to provide a cylindrical bore which is capable of receiving securing means, here in the form of a cylindrical split pin 106 of conventional type (FIG. 9). In short, the use of the filler elements in the respective slots 96 in the blocks 36 completes the solidity of the blocks and makes the structure available for use with a single-row die annulus. At this point, it should be recognized, of course, that the same principles could be applied in a die structure having other shape characteristics, as a straight die or the like, because the principles are deemed to be broadly novel.

When it is desired to convert the die structure to one characterized by multiple rows of die openings, the filler means 98 are removed and are replaced in part by partition means which functions to divide each of the openings circumferentially into a pair of axially separated die cells, indicated at 108 and 110 in FIGS. 1 and 4. In other words, in this particular instance, the single row of die openings 38 is divided into a double row of die cells 108 and 110.

It will be clear that, since the notches 96 in the blocks 36 open radially inwardly, the fillers 98 may be removed in the same direction, leaving the circumferentially alined row of slots 96 available to receive a segmented ring structure 112 (FIGS. 3, 4 and 5), here made up of three segments or sections, the circumferentially spaced radial junctions of which appear in FIG. 2 at 114, 116 and 118. Since each of these is on the order of 120° in extent, it will be seen that they may be readily assembled in end-to-end relationship so as to afford a continuous ring in operation. Each segment may be provided with a semicylindrical groove 120 (FIG. 7) for receiving groove pins such as those at 106, which serve as means for removably securing the segmented ring 112 in place.

In a practical construction, it is desired to divide the row of openings equally and consequently the plane of the ring 112 is centrally between the plate means 30 and 32; although, multiplication of this possibility will be readily apparent. For present purposes, however, the central location may be taken as typical and desirable in certain circumstances. Therefore, the segmented ring 112, being circumferentially continuous, operates as a fixed partition member at the radially inner ends of the openings 38, portions of the ring 112 between neighboring pairs of blocks of course bridging the openings in a circumferential direction and therefore establishing a fixed dimension for each of the die cells 108 and 110 at their respective inlet ends. The location of the segmented ring at the inlet ends of the cell is significant in that it divides the material before compression and compaction occurs. In the present case, therefore, the ring lies at the inner periphery of the die in conformity with the location of the cell inlets. It is not unknown, however, to provide a ring die with its cell inlets at its outer periphery, as in the U.S. patent to Sizer, 1,909,228 (FIGS. 2 and 3).

It is another feature of the invention that each of the slots 96 has a radial length greater than the radial dimension of the partition ring 112 so that a portion of the slot extends radially outwardly beyond what might be regarded as the terminal outer circle or edge of the ring so as to afford a notch or recess 122. Since, as aforesaid, the blocks 36 are identical, the notches 122 will of course become circumferentially alined so as to afford means for the hinged mounting of movable members of the partition means. In this case, the movable members are equal in number to the circumferential number of die openings 38 and actually may be identical to the fingers 78. The movable members are identified by the numeral 124, and the hinge means at the radially inner end of each member 124 is similar to the hinge means 80 on the tongue 78, the hinge means for the member 124 being shown at 126. Thus, each of the tongues or adjustable walls 124 is, like the tongues or adjustable walls 78, movable crosswise of the paired die cells 108 and 110 for each opening and consequently these two tongues operate as means for varying the cross-sectional areas of the outlet ends of the die cells. FIG. 4 shows, in broken lines, how pressure applied to the tongue 78 by the piston 90 will be transmitted, through intervening material, to pressure on the associated intervening tongue 124, it being clear of course that the latter will be displaced only half as much as the former. Theoretically, the outlet ends of the associated paired die cells 108 and 110 will be the same.

As in the case of the radially outer edge of the ring 64, the radially outer edge portions of the fixed partition ring 112, which confine the respective hinge pins 126 against inward radial escape, may be flattened so as to constitute chords rather than arcs; although, in each instance arcuate construction may be resorted to if the hinge pins 80 and 126 are likewise made arcuate.

Since the inner circumferential edge of the segmented ring 112 is presented to incoming material at the track or circle 34, it is beveled or sharpened or otherwise made relatively thin as at 128, to serve to facilitate "splitting" of the material into the paired die cells 108 and 110.

When it is desired to re-convert the die structure back to a single-row structure, the pins 106 may be radially inwardly removed to permit radially inward removal of the segments of the ring 112, which will be followed by radially inward withdrawal of the intermediate tongues or movable partition members 124. The slots 96 may then be individually filled by the filler means 98, which will be again retained in place by the pins 106. The arrangement is such that interchangeability may readily be accomplished in the field, which is particularly important when the wafering or pelleting means is employed as part of a mobile machine, as in the gathering of agricultural crops such as hay and the like.

Ready interchangeability of the structure is but one of the features of the invention, the several subsidiary features having been pointed out during the description and therefore requiring no further elaboration. Advantages and other objects will readily occur to those versed in the art, as will many modifications and alterations in the preferred embodiment disclosed, all of which may be achieved without departure from the spirit and scope of the invention.

What is claimed is:

1. Die structure, comprising: first and second parallel side means disposed in side-by-side spaced apart relation; a pair of spacers between said side means and having spaced apart opposed faces generally normal to said side means to define an opening of substantially rectangular section having first and second opposite ends and four walls, two of which are the opposed faces and the third and fourth of which are respectively the opposed portions of the first and second side means between said faces, one of said opposed portions of said side means including an element mounted for movement back and forth across the first end of the opening to vary the cross-sectional area thereof, said spacers respectively having alined slots therein intermediate the side means and at the second end of the opening; means securing the side means and spacers together; and partition means intermediate and generally parallel to the side means and dividing the opening into a pair of side-by-side die cells respectively having inlet ends at the second end of the opening and outlet ends at the first end of the opening, said partition means including a fixed partition member carried by the slots and bridging said opening at the second end thereof and having a terminal edge short of said first end of the opening, a movable partition member extending from said edge of the fixed member and between said opposed faces to a free-terminal end adjacent to the first end of the opening, and means at said edge of the fixed member mounting said movable member for swinging movement of its free end back and forth across the first end of the opening between the third and fourth walls to achieve variations in the outlet ends of said die cells.

2. The invention defined in claim 1, in which: each slot extends toward the first end of the opening beyond the fixed partition member so as to afford a recess facing to the interior of the opening; and the means mounting the movable partition member includes a hinge on an axis parallel to the side means and having end portions projecting respectively into said recesses.

3. The invention defined in claim 2, in which: the fixed partition member is removable from the slots in the direction of the second end of the opening to release the hinge portions from said recesses so as to enable withdrawal of said movable partition member also via said second end of the opening.

4. Annular die structure, comprising: a pair of coaxially spaced apart side means; a plurality of similar, uniformly circumferentially spaced apart radial spacers between the side means to provide a like plurality of similar radial openings having radially opposed first and second ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, one of said opposed portions of said side means including an element mounted for movement back and forth relative to its respective opposed portion of the other side means to vary the cross-sectional areas of the respective openings at their first ends, said spacers respectively having slots therein circumferentially aligned at the second ends of the openings and intermediate the side means; means securing the spacers and side means together; and annular partition means dividing the plurality of openings into two annular rows of die cells, including ring means carried by the slots and having a plurality of portions circumferentially bridging the openings at said second ends thereof to afford a fixed partition member defining inlet ends for the cells, a plurality of movable partition members, one of each opening, forming generally radial extensions respectively of the bridging portions of the ring means and extending to said first ends of the openings to define outlet ends for the cells, and means mounting each movable member for back and fourth movement between the third and fourth walls of the associated opening to enable variation in the cross-sectional areas of the outlet ends of the associated die cells.

5. The invention defined in claim 4, in which: each slot extends toward the first end of the associated opening beyond the fixed partition member so as to afford a recess facing circumferentially to the interior of said opening; and the means mounting each movable partition member includes a hinge on an axis parallel to the side means and having end portions projecting respectively into the recesses of the associated neighboring pair of spacers.

6. The invention defined in claim 5, in which: the ring means is segmented and radially removable from the slots in the direction of the second ends of the openings to release the hinge portions from said recesses so as to enable withdrawal of said movable partition members also via said second ends of the openings.

7. The invention defined in claim 4, in which: said ring means has an annular beveled edge at the inlet ends of said die cells.

8. Die structure, comprising: first and second parallel side means disposed in side-by-side spaced apart relation; a pair of spacers between said side means and having spaced apart opposed faces generally normal to said side means to define an opening of substantially rectangular section having first and second opposite ends and four walls, two of which are the opposed faces and the third and fourth of which are respectively the opposed portions of the first and second side means between said faces, one of said opposed portions of said side means including an element mounted for movement back and fourth across the first end of the opening to vary the cross-sectional area thereof; means securing the side means and spacers together; and partition means intermediate and generally parallel to the side means and dividing the opening into a pair of side-by-side die cells respectively having inlet ends at the second end of the opening and outlet ends at the first end of the opening, said partition means including a fixed partition member carried by the spacers at and bridging the second end of the opening and having a terminal edge short of said first end of the opening, a separate movable partition member extending from said edge of the fixed member and between said opposed faces to the first end of the opening, and means mounting said movable member for movement back and forth across the first end of the opening between the third and fourth walls to achieve variation in the outlet ends of said die cells.

9. The invention defined in claim 8, in which: the means mounting the movable partition member comprises hinge means paralleling the fixed member at said one edge thereof and including cooperative pintle and recess portions on said movable member and spacers.

10. Die structure, comprising: first and second parallel side means disposed in side-by-side spaced apart relation; a pair of spacers between said side means and having spaced apart opposed faces generally normal to said side means to define an opening of substantially rectangular section having first and second opposite ends and four walls, two of which are the opposed faces and the third and fourth of which are respectively the opposed portions of the first and second side means between said faces, one of said opposed portions of said side means including an element mounted for movement back and forth across the first end of the opening to vary the cross-sectional area of said one end, said spacers respectively having alined slots therein intermediate the side means and at the second end of the opening; filler means carried by the slots and respectively having opposed face portions respectively flush with said opposed faces of the spacers; and means removably securing said filler means in said slots.

11. Annular die structure, comprising: a pair of coaxially spaced apart side means; a plurality of similar, uniformly circumferentially spaced apart radial spacers between the side means to provide a like plurality of similar radial openings having radially opposed first and second ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and forth of which are axially opposed portions of the side means between said neighboring spacers, one of said opposed portions of said side means including an element mounted for movement back and forth relative to its respective opposed portion of the other side means to vary the cross-sectional area of the respective opening at its first end, said spacers respectively having slots therein circumferentially aligned at the second ends of the openings and intermediate the side means; a plurality of filler means, one for each spacer, respectively carried by and closing the slots, each filler means being shaped and dimensioned to afford substantially complete and planar faces for opposite faces of its spacer; and a plurality of securing means removably securing the filler means respectively to the spacers.

12. Die structure of the class described, comprising: a pair of parallel side elements and a pair of spacer elements disposed between said side elements and spacing said side elements apart, said spacer elements themselves being spaced apart to combine with the side elements in providing a die opening having opposite inlet and output ends; first means rigidly securing the side and spacer elements together; the spacer elements respectively having slots therein disposed lengthwise of the opening and leading to and opening at the inlet end of the opening and alined in a plane substantially midway between the other elements; partition means extending from end to end of and within the opening and lying generally in said plane to divide the opening into a pair of similar side-by-side die cells; and second means separate from said first means and removably securing the partition means in place, including portions connected to and projecting from said partition means and received respectively in said slots and carrying the partition means for insertion and withdrawal thereof lengthwise of said opening via said inlet end of the opening while the spacer and side elements remain in place.

13. Die structure of the class described, comprising: an annulus including a pair of coaxially spaced apart ring-like side elements and a plurality of uniformly circumferentially spaced generally radial spacer elements disposed between and connected to the side elements to provide a like plurality of die openings respectively having radially opposite inlet and outlet ends; partition means including a like plurality of radial dividers and disposed within each opening and dividing such opening into a pair of similar, generally radial die cells respectively having inlet and outlet ends at the inlet and outlet ends of said opening; and means adjacent to the inlet ends of the openings and removably securing said dividers in place for radial insertion in and withdrawal from the inlet ends of their respective openings while the spacer elements remain in place.

14. Die structure of the class described, comprising: an annulus including a pair of coaxially spaced apart ring-like side elements and a plurality of uniformly circumferentially spaced generally radial spacer elements disposed between and connected to the side elements to provide a like plurality of die openings respectively having radially opposite inlet and outlet ends, opposed portions of two spacer elements at the inlet end of each opening having radial slots opening to the interior of said opening in alinement crosswise of said opening and also leading radially to the inlet end of said opening; partition means including a like plurality of radial dividers and disposed within each opening and dividing such opening into a pair of similar, generally radial die cells respectively having inlet and outlet ends at the inlet and outlet ends of said opening, each divider having at the inlet end of its associated die opening opposed parts radially received respectively by the slots in the associated two elements for mounting said divider for radial insertion into and withdrawal from the inlet end of its associated die opening while the spacer elements remain in place; and means adjacent to the inlet ends of the openings and removably securing said dividers in place.

15. Annular die structure, comprising: a pair of coaxially spaced apart side means; a plurality of similar, uniformly circumferentially spaced apart radial spacers between the side means to provide a like plurality of similar radial openings having radially opposed inlet and outlet ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, one of said opposed portions of said side means including an element mounted for movement back and forth relative to its respective opposed portion of the other side means to vary the cross-sectional areas of the respective openings at their outlet ends, said spacers respectively having slots therein circumferentially alined at the inlet ends of the openings and intermediate the side means; means securing the spacers and side means together; and annular partition means dividing the plurality of openings at least at their inlet ends into two annular rows of inlets, said partition means including a segmented ring carried by the slots and having a plurality of portions circumferentially bridging the openings at said inlet ends thereof.

16. Annular die structure, comprising: a pair of coaxially spaced apart side means; a plurality of similar, uniformly circumferentially spaced apart radial spacers between the side means to provide a like plurality of similar radial openings having radially opposed inlet and outlet ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, said spacers respectively having slots therein circumferentially alined at the inlet ends of the openings and intermediate the side means; means securing the spacers and side means together; and annular partition means dividing the plurality of openings at their inlet ends into two annular rows of inlets, said partition means including a segmented ring carried by the slots and having a plurality of portions circumferentially bridging the openings at said inlet ends thereof.

17. Die structure, comprising: first and second parallel side means disposed in side-by-side spaced apart relation; a pair of spacers between said side means and having spaced apart opposed faces generally normal to said side means to define an opening of substantially rectangular section having first and second opposite ends and four walls, two of which are the opposed faces and the third and fourth of which are respectively the opposed portions of the first and second side means between said faces, said spacers respectively having alined slots therein intermediate the side means and at the second end of the opening; filler means carried by the slots and respectively having opposed face portions respectively flush with said opposed faces of the spacers; and means removably securing said filler means in said slots.

18. Annular die structure, comprising: a pair of coaxially spaced apart side means; a plurality of similar, uniformly circumferentially spaced apart radial spacers between the side means to provide a like plurality of similar radial openings having radially opposed inlet and outlet ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, said spacers respectively having slots therein circumferentially alined at the inlet ends of the openings and intermediate the side means; means securing the spacers and side means together; and annular partition means dividing the plurality of openings at least at their inlet ends into two annular rows of inlets, said partition means including a ring part carried by the slots and having a plurality of portions circumferentially bridging the openings at said inlet ends thereof.

19. Annular die structure, comprising: a pair of coaxially spaced apart side means; a plurality of similar, uniformly circumferentially spaced apart radial spacers between the side means to provide a like plurality of similar radial openings having radially opposed inlet and outlet ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, at least each fourth wall being mounted for movement back and forth relative to its respective third wall to vary the cross-sectional areas of the respective openings at their outlet ends, said spacers respectively having slots therein circumferentially alined at the inlet ends of the openings and intermediate the side means; means securing the spacers and side means together; and annular partition means dividing the plurality of openings at least at their inlet ends into two annular rows of inlets, said partition means including a ring part carried by the slots and having a plurality of portions circumferentially bridging the openings at said inlet ends thereof and having an outer peripheral edge short of said outlet ends of the openings.

20. Annular die structure, comprising: a pair of coaxially spaced apart side means; a plurality of similar, uniformly circumferentially spaced apart radial spacers between the side means to provide a like plurality of similar radial openings having radially opposed inlet and outlet ends lying respectively generally on first and second concentric circles, each spacer having circumferentially opposite faces to combine with the side means to give the openings a generally rectangular cross-section having four walls, two of which are circumferentially opposed faces of a pair of neighboring spacers and the third and fourth of which are axially opposed portions of the side means between said neighboring spacers, said spacers respectively having slots therein circumferentially alined at the inlet ends of the openings and intermediate the side means; means securing the spacers and side means together; and annular partition means dividing the plurality of openings at least at their inlet ends into two annular rows of inlets, said partition means including a ring part carried by the slots and having a plurality of portions circumferentially bridging the openings at said inlet ends thereof and having an outer peripheral edge short of said outlet ends of the openings.

References Cited by the Examiner
UNITED STATES PATENTS

| | | | |
|---|---|---|---|
| 729,149 | 5/1903 | Fenn | 25—12 |
| 2,603,170 | 7/1952 | Meakin | 107—8.35 |
| 3,090,182 | 5/1963 | Johnson et al. | 56—1 |

FOREIGN PATENTS

| | | |
|---|---|---|
| 1,250,174 | 11/1960 | France. |
| 939,759 | 10/1963 | Great Britain. |

WALTER A. SCHEEL, *Primary Examiner.*

WILLIAM B. PENN, ROBERT E. PULFREY,
*Examiners.*

JOSEPH SHEA, *Assistant Examiner.*